(12) United States Patent
Walton

(10) Patent No.: US 6,416,883 B1
(45) Date of Patent: Jul. 9, 2002

(54) LEAD-FREE SOLDER

(75) Inventor: Ian Noel Walton, Warrandyte (AU)

(73) Assignee: Ecosolder International Pty Ltd, Melbourne (AU)

( * ) Notice: Subject to any disclaimer, the term of this patent is extended or adjusted under 35 U.S.C. 154(b) by 0 days.

(21) Appl. No.: 09/403,320

(22) PCT Filed: Apr. 22, 1998

(86) PCT No.: PCT/AU98/00291

§ 371 (c)(1),
(2), (4) Date: Jan. 3, 2000

(87) PCT Pub. No.: WO98/48069

PCT Pub. Date: Oct. 29, 1998

(30) Foreign Application Priority Data

Apr. 22, 1997 (AU) .............................................. PO 7474
May 30, 1997 (AU) .............................................. PO 7090

(51) Int. Cl.$^7$ ......................... B32B 15/00; C22C 13/02; B23K 35/26
(52) U.S. Cl. ....................... 428/647; 428/646; 420/561; 420/562; 228/262.61
(58) Field of Search ................................. 420/561, 562; 428/646, 647, 648, 939; 228/56.3, 262.1, 262.61

(56) References Cited

U.S. PATENT DOCUMENTS

| | | | |
|---|---|---|---|
| 1,437,641 A | 12/1922 | Ferriere et al. | |
| 3,607,253 A | 9/1971 | Cain et al. ................ | 75/175 A |
| 4,236,922 A | * 12/1980 | Michl et al. .............. | 75/134 D |
| 4,643,875 A | 2/1987 | Mizuhara ................... | 420/502 |
| 4,670,217 A | 6/1987 | Henson et al. ............. | 420/562 |
| 4,695,428 A | 9/1987 | Ballentine et al. ......... | 420/561 |
| 4,758,407 A | 7/1988 | Ballentine et al. ......... | 420/560 |
| 4,806,309 A | 2/1989 | Tulman ...................... | 420/562 |
| 4,879,096 A | 11/1989 | Naton ........................ | 420/561 |
| 4,929,423 A | 5/1990 | Tucker ....................... | 420/561 |
| 5,320,272 A | 6/1994 | Melton et al. ......... | 228/180.21 |
| 5,328,660 A | 7/1994 | Gonya et al. ............... | 420/562 |
| 5,368,814 A | 11/1994 | Gonya et al. ............... | 420/587 |
| 5,393,489 A | * 2/1995 | Gonya et al. ............... | 420/561 |
| 5,405,577 A | * 4/1995 | Seelig et al. ............... | 420/561 |
| 5,411,703 A | * 5/1995 | Gonya et al. ............... | 420/561 |
| 5,733,501 A | 3/1998 | Takao et al. ................ | 420/562 |
| 5,833,921 A | * 11/1998 | Paruchuri et al. .......... | 420/589 |
| 5,918,795 A | * 7/1999 | Yamaguchi et al. ........ | 228/200 |
| 5,980,822 A | * 11/1999 | Moon et al. ................ | 420/561 |
| 6,077,477 A | * 6/2000 | Sakai et al. ................ | 420/560 |

FOREIGN PATENT DOCUMENTS

| | | |
|---|---|---|
| EP | 0 251 611 A2 | 1/1988 |
| EP | 0 336 575 A1 | 3/1989 |
| EP | 0 336 575 A1 | 10/1989 |
| EP | 0 787 559 A1 | 8/1997 |
| GB | 2158459 A | 11/1985 |
| JP | 8-206874 * | 8/1996 |
| WO | WO 97/47425 | 12/1997 |

OTHER PUBLICATIONS

Seelig, Karl, "A Study of Lead–Free Solder Alloys", IPC-Works '99, An International Summit on Lead–Free Electronics Assemblies, Oct. 25–28, 1999 (Minneapolis, MN).

Suganuma, Katsuaki, "Research and Development for Lead–Free Soldering in Japan," IPCWorks '99, An International Summit on Lead–Free Electronics Assemblies, Oct. 25–28, 1999 (Minneapolis, MN).

Handwerker, Carol, "NCMS Lead–Free Solder Project: A Summary of Results, Conclusions and Recommendations," IPCWorks '99, An International Summit on Lead–Free Electronics Assemblies, Oct. 25–28, 1999 (Minneapolis, MN).

* cited by examiner

Primary Examiner—John J. Zimmerman
(74) Attorney, Agent, or Firm—Nath & Associates PLLC; Gath M. Nath; Jerald L. Meyer

(57) ABSTRACT

A lead-free solder composition comprising: 20 to 30 wt. % bismuth, 1.0 to 3.0 wt. % silver, 0.01 to 2.0 wt. % copper, 0.01 to 4.0 wt. % antimony and incidental impurities, the balance being tin.

13 Claims, No Drawings

LEAD-FREE SOLDER

The present invention relates to lead-free solder compositions comprising tin, bismuth and silver. These compositions are lead-free solder compositions that are particularly useful in the soldering of electrical/electronic components to printed circuit boards.

Typical solders used in the electronics industry currently comprise a tin-lead alloy. Growing concerns over the use of lead have meant that lead-free alloys have come under consideration for the electronics industry. An article entitled "The search for lead-free solders" by W B Hampshire which appeared in Soldering and Surface Mount Technology, No 14, June 1993 provides a list of patents relating to lead-free solders. This table is as follows:

U.S. Pat. No. 4,879,096 discloses a lead-free and antimony-free solder composition which comprises about 0.05 to about 3.0. percent by weight of silver, about 0.5 to about 6.0 percent by weight of copper, about 0.1 to 2.0 percent by weight of bismuth and about 88 percent to about 99.35 percent to be particularly useful for joining copper tubing, brass pipes and fittings to by used in plumbing. U.S. Pat. No. 4,929,423 also discloses a lead-free alloy for joining and sealing which is useful as a plumbing solder which comprises from 0.08 to 20.0 percent by weight of bismuth, from 0.02 to 1.5 percent by weight silver, from 0 to 0.10 percent by weight of phosphorus, from 0 to 0.20 percent of a rare earth mixture and the balance tin, together with incidental impurities. This alloy has a similar pasty range to the traditional tin-lead plumbing solders.

Some Lead-free Solder Patents

| Number | Year | Company | Ag | Cu | Sb | Zn | Bi | Other |
|---|---|---|---|---|---|---|---|---|
| U.S. Pat. No. 4,879,096 | 1989 | Oatey | 0.05–3.0 | 0.5–6.0 | | | 0.1–3.0 | |
| Eur 0,336,575 | 1989 | Cookson | 0.01–1.5 | 0.02–1.5 | | | 0.08–20 | 0–0.1 P + 0–0.2 Re |
| U.S. Pat. No. 4,806,309 | 1989 | Willard Indus | 0.1–0.5 | | 3.0–5.0 | | 1.0–4.5 | |
| U.S. Pat. No. 4,758,407 | 1988 | J W Harris | 0–5.0 | 3.0–5.0 | | | | 0.1–2.0 Ni |
| | | | 0–0.5 | 3.0–5.0 | 4.0–6.0 | | | 0–2.0 Ni |
| U.S. Pat. No. 4,695,428 | 1987 | J W Harris | 0.1–3.0 | 0.1–3.0 | 0.5–4.0 | 0.5–4.0 | | |
| Eur 0,251,611 | 1988 | Engelhard | 0.05–3.0 | 0.7–6.0 | | | | |
| U.S. Pat. No. 4,670,217 | 1987 | J W Harris | 0.5–2.0 | | 0.5–4.0 | 0.5–4.0 | | |
| UK 2,158,459A | 1985 | IMI Yorkshire | | 0.3–0.7 | | | | |
| Jap 82 30598 | 1982 | Aoki Metal | 0.1–2.0 | | 0.05–0.5 | | | 0.5–1.0 In |
| U.S. Pat. No. 1,437,641 | 1922 | | 0.5–4.5 | 0.5–4.5 | | | 0.5–9.5 | |

It is stated in the above article that almost exclusively the above patents were developed for plumbing applications which allow higher temperatures than for electronic applications. Such higher temperatures will easily damage the electrical components, especially semiconductor devices having no heat sink protection. Also, alloys with some pasty range are usually preferred in the making of plumbing joints, while electronics solders have much shorter pasty ranges. The authors therefore thought it doubtful that any of the above solders would substitute successfully in the electronics industry. The article looks at various eutectics of tin-x alloys but dismisses tin-bismuth alloys.

A number of other patents have been granted for lead-free solders. For example, U.S. Pat. No. 5,368,814 discloses a multi component solder alloy containing at least about 50 weight percent Bi, up to about 50 weight percent Sn (basis total Sn and Bi), and an effective amount of a physical and mechanical property enhancing third component. The third component can be Cu, In, Ag and combinations of Cu and Ag.

U.S. Pat. No. 5,320,272 discloses an electronic package having a solder connection for bonding faying surfaces formed of a tin-bismuth alloy comprising a tertiary metal. The examples show tin-bismuth alloys containing gold as the. tertiary metal. The alloy is stated to preferably contain about 48 to 68 weight percent bismuth. It is stated that tin alloys containing less than 30 weight percent or greater than 70 weight percent bismuth require relatively high reflow temperatures that tend to damage other connection components typically found in a microelectronic package. This patent discloses applying the tertiary metal to a faying surface and thereafter a deposit of tin-bismuth solder paste is applied to the film.

For reasons such as environmental and health reasons it would be an advantage to use a lead-free solder in electronic applications. It would also be and advantage if such a solder was able to be used with existing-machinery used for Pb/Sn alloys.

The present inventors have now discovered a new solder composition which may be used in electronic applications. according to the present invention there is a solder composition comprising:

15.0 to 30.0% bismuth,
1.0 to 3.0% silver, and otionally comprising 0 to 2.0%, preferably 0.01 to 2.0%, copper and 0 to 4.0% antimony and incidental impurities, the balance being tin.

Where the terms "comprise", "comprises", "comprised" or "comprising" are used in this specification they are to be interpreted as specifying the presence of the stated features, integers, steps or components referred to, but not to preclude the presence or addition of one or more other feature, integer, step, component of group thereof.

The composition of the present invention may include small amounts of, typically less than about 4.0 percent, of other alloying agents to enhance the mechanical properties. Such optional agents may include, for example, copper, antimony and/or gallium. In a preferred embodiment the solder of the present invention includes 0 to 2.0%, more preferably 0.01 to 2.0%, copper and/or 0 to 4% antimony. It is preferred that the solder of the present invention is lead-free other than any lead which is present as impurities. Commercially available bismuth may contain minor amounts of lead as bismuth is found in nature in combination with lead. It is usually in very low concentrations, in the order of a few ppm.

The solders of the present invention may be formed as a mixture of an alloy. When used as a mixture they may be applied as a paste to, for example, the surface mount of a printed circuit board by hand or automatic dispenser, using a stencil similar to silk screening or by direct imaging. The composition of the present invention may also be formed as an alloy.

Soldering is a low temperature, generally reversible, metallurgical joining process. Low temperature and reversibility are especially important in electronics applications because of the materials involved and the necessity for reworking and replacing defective components. A solder composition used in electronics fabrication must be wettable as a solder alloy and have at least on component capable of forming an electrically conductive, thermally stable, non-brittle, plastic intermetallic with the pad or land metallurgy. For these reasons the most common solder alloys have been lead-based alloys, as Sn-Pb alloys Although alternatives have been suggested for other applications such as plumbing applications, Pb/Sn solders are most commonly used for electronic applications. Pb/Sn alloys have a low solidus temperature, they are workable and the resulting Cu/Sn intermetallics (formed at the solder/Cu contact interface) forms over a wide temperature range, good adhesion of Cu/Sn intermetallics is obtained from Pb/Sn alloys to Cu lands and pads, the process equipment is readily available and adjuncts such as resins, fluxes and solder mixes for Pb/Sn alloys are of low cost. The relatively low temperature required for processing Pb/Sn solder alloys are particularly important as is the "softness" or plasticity of lead-based solders.

The solder of the present invention has many of the above properties which make it a suitable replacement for Pb/Sn solders in electronic applications. A particular advantage of the solder of the present invention is that it may be used as a "drop in" replacement for existing Pb/Sn solders. A disadvantage with other lead-free solders which have been proposed for electronic applications is that the existing machinery used for Pb/Sn solders may not be used with the lead-free replacements. The composition of the present invention may be used as a direct substitute for Pb/Sn alloys therefore avoiding equipment replacement costs.

Most of the previously suggested lead-free solders do not melting point, pasty range, surface tension and wetting ability. The alloys of the present invention approach conventional lead solders in performance of the solder joint.

The solder composition of the present invention is designed to have good wetting and surface tension properties to provide reliable solder joints as required by the electronics industry.

Lead-free tin alloys have also been proposed to be plated onto electronics components to replace currently used tin-lead coatings. The solders of the present invention are particularly useful for use with such lead-free tin alloys.

A solder must pass many specifications and therefore the ability to vary the alloy to tailor it to the specification required is an advantage. Specifications typically refer to some of all of the following:

melting point and range;

creep resistance;

thermocycling performance;

tensile test; and electrical properties.

The individual figures for each of the above may vary from country to country and from corporation to corporation. The solder of the present invention may be adjusted by varying the components of the composition. The melting points may be adjusted between a minimum of about 155° C. and a maximum of about 230° C. Increasing the proportion of bismuth in the composition lowers the melting point. The presence of silver in the composition gives improved wetting, surface tension, wicking and the ability to flow to the composition. Increasing the proportion of silver in the composition narrows the melting point range.

In a preferred embodiment the solder of the present invetion further comprises from 0 to 2.0%, more preferably from 0.01 to 2.0%, copper. Addition of up to 2.0% copper to the solder of the present invention reduces the formation of a copper tin intermetallic layer between the solder and a copper substrate.

Addition of up to 4.0% antimony improves the high temperature performance of the solder.

The ability to adjust the melting points of the solder of the present invention may be useful in number of application. For example, using a alloy with a relatively high melting point. Further components can then be soldered on to the same side or the other side of the printed circuit board with solder having a relatively lower melting point without first components falling off.

For less temperature sensitive components a higher melting point alloy may be acceptable. Therefore, the components of the composition may be varied to reduce cost.

A further example of when an adjustment in the melting point of the solder may be important is when hot air levelling is used during the manufacture of a printed circuit board. In this case, the solder may become contaminated with copper from the board's surface. To increase the life of the solder pot, some copper/tin crystals are typically removed at a temperature of between 193 to 195° C. In such a case it is desirable to adjust the melting point of the solder so that this may be done without losing any of the solder.

The solder composition of the present invention are useful in all electronic applications but are particularly useful in joining integrated surface chips to chip carriers and substrates, as printed circuit boards, joining chip carriers to substrates, joining circuitisation lands and pads in multilayer printed circuit boards and joining components with leads to the printed circuit board and ball grid arrays.

The solder composition of the present invention may be applied by any method currently used in electronics applications, for example the composition may be deposited onto electrical contacts of a printed circuit. The solder composition may be applied for example by hand soldering, hot air levelling, wave solder deposition, electro deposition, as a solder paste or as solder balls. The solder paste can be applied by using a stencil, direct dispensing or direct imaging. The alloy can also be electroplated on to components.

The following examples in Table 1 illustrate the solder compositions of the present invention. All the examples shown in Table 1 contain 0.1% antimony. Melting points were measured with an RTD platinum resistance thermometer.

| Example | % wt Tin | % wt Silver | % wt Bismuth | Melting point (° C.) |
| --- | --- | --- | --- | --- |
| 1 | 75.0 | 2.0 | 23.0 | 170–190 |
| 2 | 84.0 | 1.0 | 15.0 | 198–230 |
| 3 | 69.0 | 1.0 | 30.0 | 194–206 |
| 4 | 68.2 | 1.8 | 30.0 | 172–188 |
| 5 | 71.38 | 1.62 | 27.0 | 174–195 |
| 6 | 74 | 2 | 24 | 165–186 |
| 7 | 73 | 3 | 24 | 163–198 |

The melting point range in the above table is the pasty range of the solder. Examples of suitable copper and/or antimony containing alloys are shown in Table II as follows:

| Example | % wt Tin | % wt Silver | % wt Bismuth | % wt Copper | % wt Antimony |
|---------|----------|-------------|--------------|-------------|---------------|
| 9       | 72.5     | 1.8         | 25.0         | 0.5         | 0.2           |
| 10      | 74.5     | 1.8         | 23.0         | 0.5         | 0.2           |
| 11      | 74.3     | 1.8         | 23.0         | 0.5         | 0.4           |
| 12      | 69.8     | 1.5         | 27.0         | 0.7         | 1.0           |
| 13      | 75.6     | 1.8         | 22.0         | 0.5         | 0.1           |
| 14      | 77.6     | 1.8         | 20.0         | 0.5         | 0.1           |
| 15      | 76.7     | 1.8         | 20.0         | 1.0         | 0.5           |

The alloy composition of the invention is designed as a drop in replacement for conventional Tin/Lead solder when a lead free product is required.

Specifically, the alloy composition is designed to be used with the same parameters as Tin/Lead which provides a number of advantages such as the ability to use the alloy composition with conventional equipment. For example, the melting point is such that the same fluxes and solder paste constituents can be used. In addition, the alloy has a good thermocycling performance in the range minus 55 to plus 125 Deg. C.

The Bismuth content affects the melting point of the alloy composition, the Silver is used to improve the wetting performance and narrow the melting range. Copper is added to the alloy composition to reduce intermetallic formation and improve creep resistance. Antimony is used to refine the grain structure, improve the high temperature performance and strength of the alloy.

It is understood that the foregoing description refers merely to preferred embodiments of the present invention and that variations and modifications will be possible thereto without departing from the spirit and scope of the invention.

The claims defining the invention are as follows:

1. A lead-free solder composition comprising by weight:
   20 to 30% bismuth,
   1.0 to 3.0% silver,
   0.01 to 2.0% copper,
   0.01 to 4.0% antimony and incidental impurities, the balance being tin.

2. A solder composition according to claim 1, further comprising 0.0 to 4.0% by weight other alloying agents.

3. A solder composition according to claim 1, comprising 0.02 to 2.0% antimony by weight.

4. A solder according to claim 2, wherein said other alloying agents are selected from the group consisting of antimony, gallium, and mixtures thereof.

5. A solder according to claim 1 which is an alloy.

6. A solder according to claim 1 which is a mixture.

7. Method of using a solder composition according to claim 1 in electronics applications, comprising the step of joining at least one electronics component to a circuit board by applying the solder composition to join or interface the component and the circuit board.

8. A method of joining two or more components comprising applying a solder composition according to claim 1 to the joint or interface between said components.

9. A method according to claim 8 wherein said solder is applied by hand soldering, hot air levelling, wave solder deposition, electro deposition, stencil, direct dispersing or direct imaging.

10. A method according to claim 8 wherein said components are selected from the group consisting of integrated surface chips, chip carriers, printed circuit boards, circuitization lands and pads and leads.

11. An electronics component or printed circuit board containing a solder according to claim 1.

12. A non-eutectic lead-free solder composition suitable for application as a drop-in replacement for lead-tin solders in the electronics industry and having a melting point range of 163–198° C., said composition comprising, by weight:
   20–27% bismuth,
   1.0–3.0% silver,
   0.01–2.0% copper,
   0.01–4.0% antimony,
      the balance being tin, and wherein said composition does not contain thallium.

13. The composition of claim 12 wherein the melting point range is 170–190° C.

* * * * *